United States Patent [19]

Singer, III

[11] Patent Number: 4,928,545
[45] Date of Patent: May 29, 1990

[54] STEERING COLUMN MOUNTED TRANSMISSION GEAR SHIFT MECHANISM

[75] Inventor: John C. Singer, III, Plymouth Township, Mich.

[73] Assignee: Ford Motor Company, Dearborn, Mich.

[21] Appl. No.: 324,127

[22] Filed: Mar. 16, 1989

[51] Int. Cl.⁵ .............................................. G05G 9/16
[52] U.S. Cl. .............................. 74/473 SW; 74/473 R
[58] Field of Search ................ 74/475, 473 SW, 473 R

[56] References Cited

U.S. PATENT DOCUMENTS

| | | | |
|---|---|---|---|
| 3,600,966 | 8/1971 | Anderson | 74/473 SW |
| 3,646,828 | 3/1972 | Milton et al. | 74/473 SW X |
| 4,132,123 | 1/1979 | Ishii et al. | 74/473 SW |
| 4,446,951 | 5/1984 | Morris | 74/473 SW X |
| 4,537,088 | 8/1985 | Kubota | 74/473 SW |

Primary Examiner—Peter A. Aschenbrenner
Attorney, Agent, or Firm—Frank G. McKenzie; Donald J. Harrington

[57] ABSTRACT

A transmission control selector arm transmits movement of a gear shift lever to the manual valve of an automatic transmission through a shift mechanism that includes a tube, rotatably mounted and supported against displacement and having one end pivotably supporting the gear shift lever and a second end pivotably supporting the transmission control selector lever. A plunger is supported within the tube for axial displacement and defines, near one axial end, a hole, into which the gear shift lever is retained for rotation about the pivoted support on the tube. The selector lever is supported for movement about a second pivotal joint on the tube. A control selector position insert mounted on the tube defines multiple detent surfaces corresponding to the various positions among which the gear selector lever can be moved. These detent surfaces are located adjacent the selector lever. The lever and plunger are biased by a spring so that the selector lever moves axially away from the detent surfaces as the gear selector lever moves and returns into contact with the detent surfaces when manual control of the position of the gear shift lever is absent.

13 Claims, 3 Drawing Sheets

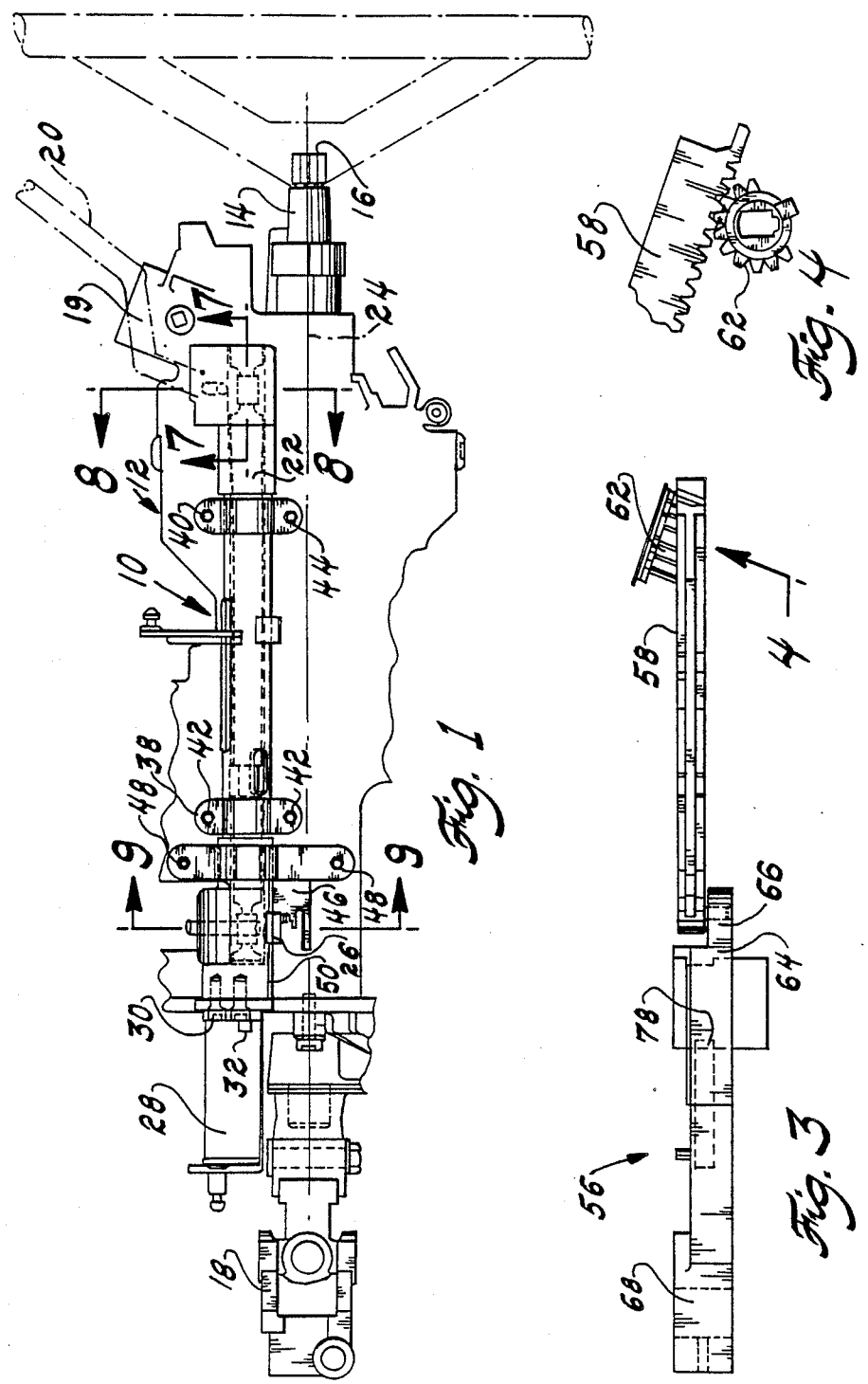

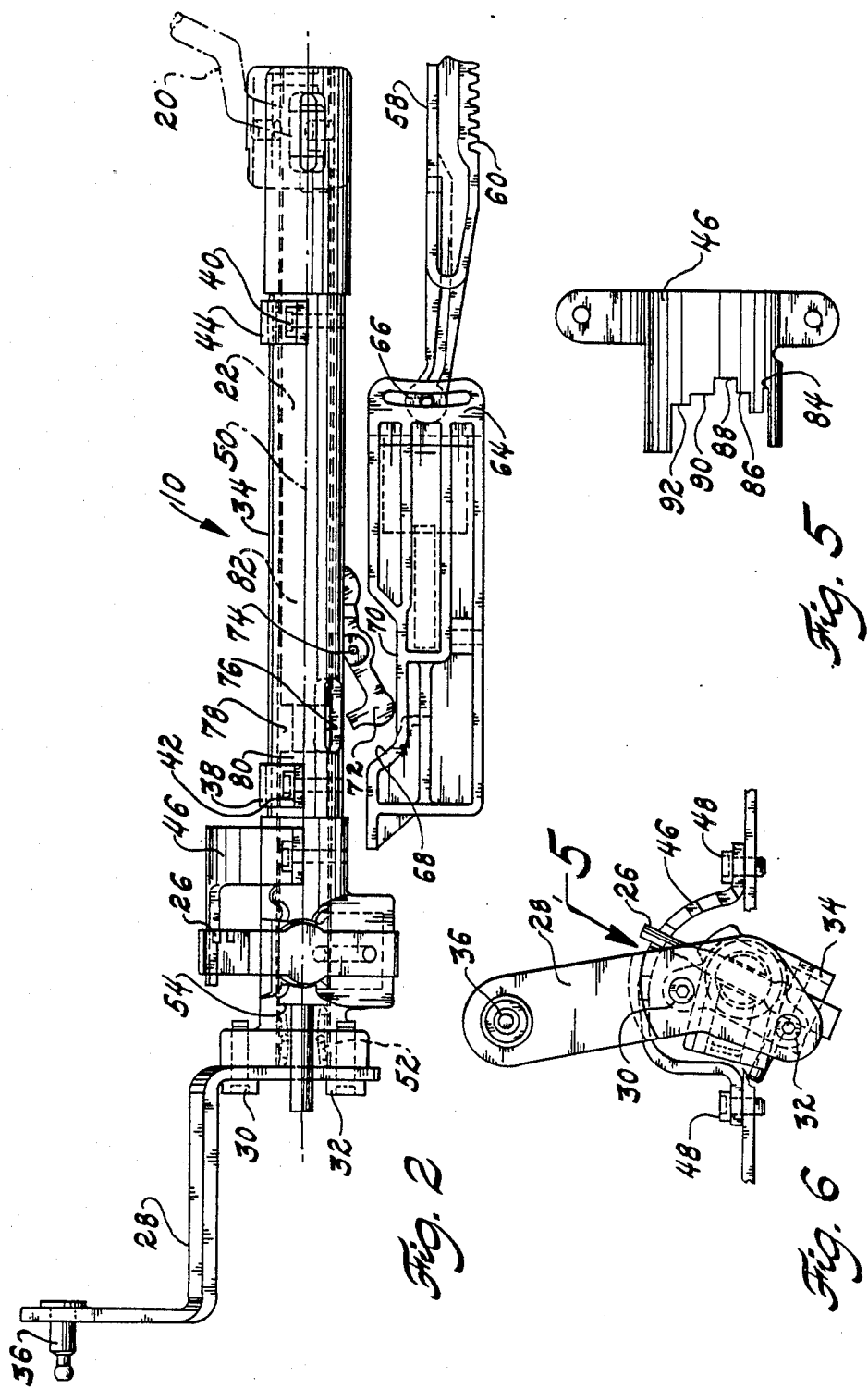

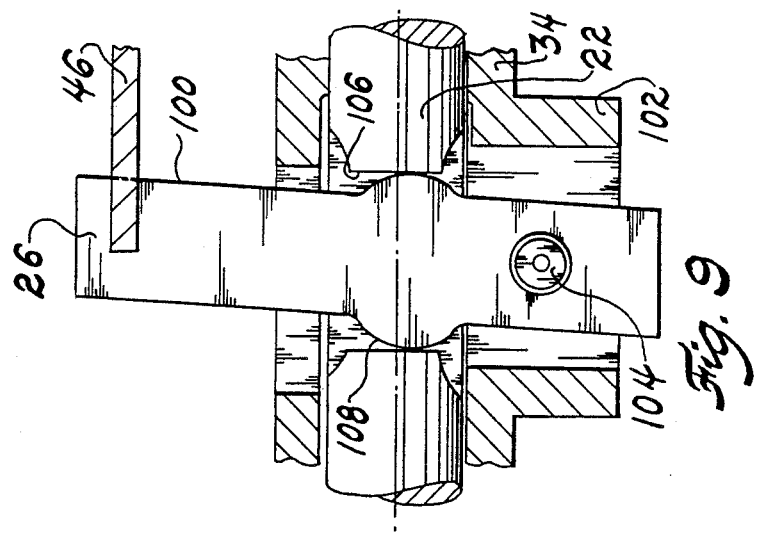
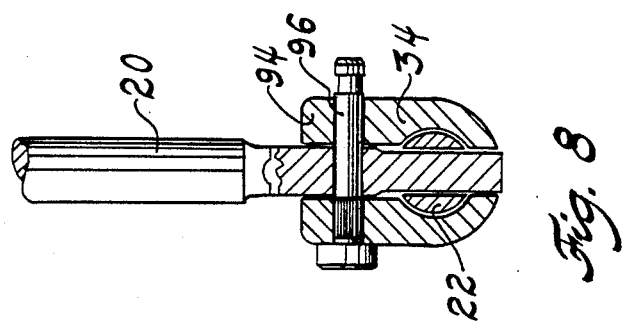
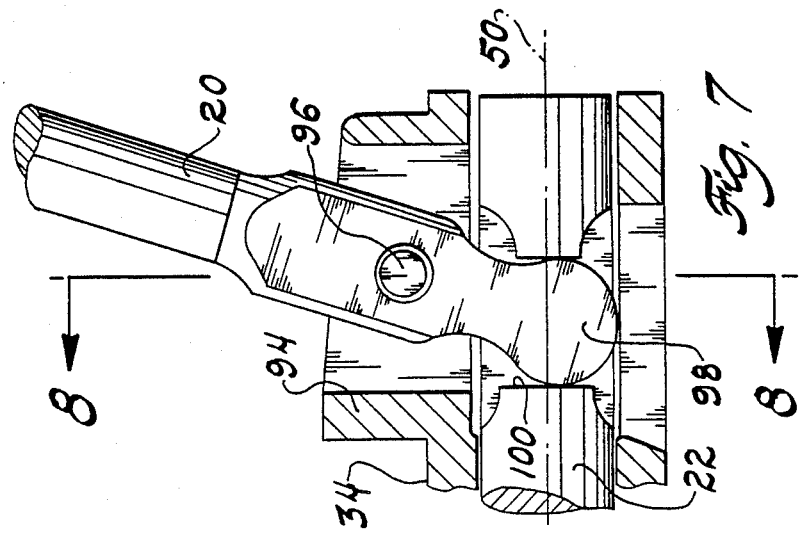

4,928,545

STEERING COLUMN MOUNTED TRANSMISSION GEAR SHIFT MECHANISM

BACKGROUND OF THE INVENTION

Field of the Invention

This invention relates to a gear shift mechanism for an automatic transmission. More particularly, the invention pertains to a steering column mounted transmission control selector mechanism for use in a vehicle equipped with air bags stored in the steering wheel at the end of the steering column.

SUMMARY OF THE INVENTION

A transmission control selector arm transmits movement of a gear shift lever to the manual valve of an automatic transmission through a shift mechanism that includes a tube, rotatably mounted and supported against displacement and having one end pivotably supporting the gear shift lever and a second end pivotably supporting the transmission control selector lever. A plunger is supported within the tube for axial displacement and defines, near one axial end, a hole, into which the gear shift lever is retained for rotation about the pivoted support on the tube. The selector lever is supported for movement about a second pivotal joint on the tube. A control selector position insert mounted on the tube defines multiple detent surfaces corresponding to the various positions among which the gear selector lever can be moved. These detent surfaces are located adjacent the selector lever. The lever and plunger are biased by a spring so that the selector lever moves axially away from the detent surfaces as the gear selector lever moves and returns into contact with the detent surfaces when manual control of the position of the gear shift lever is absent.

An object of this invention is to provide a gear shift mechanism suitable for use with a motor vehicle equipped with air bags stored in the steering wheel at the end of the steering column. This invention realizes this objective by locating the selector lever and selector insert distant from the steering wheel to allow storage space for an evacuated air bag.

The mechanism of this invention maintains continual contact between a plunger, which moves under control of a shift lever, a selector lever and the shift lever. The plunger is biased by a spring to a position where the selector lever rests on detent surface spaced angularly about the axis of the plunger on the insert. The spring forces the shift lever also to a corresponding position. Due to continual contact among these components, the spring force operates to accelerate the entire mass of the assembly when the shift lever is released abruptly. Therefore, potential energy in the spring is dissipated by accelerating a relatively large mass rather than by impact as the selector lever strikes a detent surface. For this reason, loud and objectionable noise is avoided as the selector lever contacts the selector insert detent surfaces.

BRIEF DESCRIPTION OF THE DRAWINGS

FIG. 1 is a top view of a transmission control selector assembly and steering column.

FIG. 2 is a side view of a selector assembly and ignition key interlock.

FIG. 3 is a top view of the ignition key interlock portion of the assembly of FIG. 2.

FIG. 4 is a view of FIG. 3 taken in direction 4.

FIG. 5 is a top view of the selector insert taken in direction 5, as indicated in FIG. 6.

FIG. 6 is an end view taken from the left-hand side of FIG. 2.

FIG. 7 a cross section taken at plane 7—7 of FIG. 1 showing a connection between the shift lever and plunger.

FIG. 8 is a cross section taken at plane 8—8 of FIG. 7.

FIG. 9 is a cross section taken at plane 9—9 of FIG. 1 showing a connection between the selector lever and plunger.

DESCRIPTION OF THE PREFERRED EMBODIMENT

Referring first to FIG. 1, a transmission control selector assembly 10 is shown mounted on a steering column assembly 12 of a motor vehicle. The steering column assembly 12 is shown in FIG. 1; the transmission selector assembly is shown in detail there and in FIG. 2. The steering column assembly includes a steering shaft and yoke assembly 14, where, at one end 16, the steering wheel is mounted and, at the opposite end 18, a steering column lower yoke is connected to the steering mechanism. The yoke transmits input control of the vehicle operator to the front wheels of the vehicle. The steering column assembly also includes a receptacle 19 where the ignition key is inserted into an ignition switch 20 and rotated between START, RUN, OFF, LOCK, and ACCESSORY positions.

A shift lever 20 extends radially outward from a pivoted connection to a free end whose position is controlled manually by the vehicle operator. The lever is connected at a first attachment to a plunger 22, which extends parallel to the axis 24 of the steering column to a second attachment to a selector lever 26. A tube 34 is surrounded by clamps 38, 40, which are fixed by bolts 42, 44, respectively, to the upper surface of the steering column assembly. The clamps permit rotation of the tube but prevent its displacement.

A control selector arm 28 is bolted at 30, 32 to the end of tube 34, within which the plunger is located. The selector arm carries a stud 36, connected to a mechanism which controls the position of a manual valve within an automatic transmission. Axial displacement and rotation of the selector lever with respect to the axis of the plunger is transmitted to the manual valve. A transmission control selector position insert 46 is connected by bolts 48 to the steering column assembly. Insert 46 defines multiple steps or detent surfaces spaced angularly about the axis 50 of the plunger. Lever 26 extends radially outward from the plunger into the system of detents on the insert and is biased into contact with the bottom of the detents by the action of a compression spring 52, located between an inner face of selector arm 28 and the end 54 of the plunger.

The ignition switch assembly includes a rack 58 having gear teeth 60 formed on its lower surface and continually meshing with the teeth of steering column locking gear wheel 62, which is turned by the vehicle operator as the ignition key is rotated within the ignition switch 20. Rack 58 is moved by rotation of the gear. axially parallel to the axis 50 and is connected to a steering column lock actuator 64 at a pivoted connection 66, which permits the upper end of the steering column assembly, 14, 16 to pivot with respect to the yoke portion 18. Actuator 64 defines a cam surface 68 and a lower surface 70 against which steering column locking pawl 72 is resiliently held in contact about a pivoted connection 74.

The lower surface of tube 34 defines an elongated slot 76 sized to receive the free end of the pawl. As the ignition switch is rotated, rack 58 moves axially and carries actuator 64 and its cam surface 68 toward the pawl, thereby causing the pawl to pivot about axis 74 and to move the free end of the pawl through slot 76 and into a recess 78, located between shoulders 80, 82 formed on plunger 22. When the pawl is so located within recess 78, it prevents axial movement, but permits rotation, of the plunger and tube.

FIG. 5 shows insert 46 viewed from above the axis of the steering column. An array of detent surfaces 84, 86, 88, 90, 92, corresponding to park, reverse, neutral, drive or low gear positions of gear selector lever 20 are formed on the insert angularly spaced about the plunger axis. FIG. 6 shows the relative positions of the component of the selector mechanism as viewed from the left-hand side of FIG. 2.

Referring now to FIG. 7, in the vicinity of the shift lever attachment, tube 34 defines an annular flange 94 in which pin 96 is retained to pivotably support the lever about the axis of the pin. The lever is formed with an end 98 having a circular cylindrical cross section, fitted in continuous contact with surfaces facing axially opposite ends of the plunger and located within slot 100, formed near the end of plunger 22. As lever 20 is pivoted about the axis of pin 96, the plunger moves parallel to its axis within the tube. As lever 20 pivots about axis 50, tube 34 and the plunger rotate about the axis.

At the opposite end of the plunger, tube 34 defines another circular flange 102, which surrounds the lower end of selector lever 26 and through which a second pin 104 is inserted to provide a pivot on which the lever rotates. Lever 26 is fitted in continuous contact with axially opposite surfaces within slot 106, formed through plunger 22. In this way, movement of shift lever 20 with respect to axis 50 causes lever 26 to rotate about axis 50 into alignment with the various detents on insert 46. Axial movement of shift lever 20 moves edge 110 of lever 26 toward and away from the detent surfaces of the insert.

The nature of the connection between the surfaces on levers 20 and 26 within their respective slots 100 and 106 in the plunger assures continuous metal-to-metal contact between the levers and plunger. Therefore, if selector lever 20 is suddenly released while lever 26 is distant from a detent surface on insert 46, spring 52 immediately forces edge 110 into contact with the detent with which it is angularly aligned. The entire mass of the plunger, selector control lever 26 and shift lever 20 moves as a unit against the force of the spring because the members of the unit abut one another.

The ignition key moves among the five positions spaced angularly about the axis of the switch. The engine starter is actuated with the ignition key in the Start position and, as is conventional, the ignition switch is loaded by a spring to move automatically from start to run when the key is released. The ignition key can be removed from the ignition switch only when the key is rotated to the Lock position. When the shift mechanism is moved to the Park position, recess 78 and slot 76 are mutually aligned axially and with the free end of pawl 72. When the shift mechanism is so disposed, rotation of the ignition switch and key to the Lock position causes the steering column lock actuator assembly 64 to move rightward from the position shown in FIG. 2, thereby causing pawl 72 to pivot against the effect of spring 78 as it rises on cam surface 68, extends through slot 76 and enters recess 78. In this position, the shift mechanism is prevented from being moved from the Park position. Axial motion is prevented in either direction because the pawl abuts the shoulders adjacent recess 78. Rotation is prevented because lever 26 cannot be rotated from contact with park detent surface 84 unless it is moved axially to clear the surface of insert 46 that separates detent surfaces 84 and 86.

Similarly, the ignition key cannot be removed from the ignition switch unless the shift mechanism is in the Park position because, when the shift mechanism is in any other position, shoulders 80 and 82 on plunger 22 close slot 76, prevent pawl 72 from entering recess 76. The pawl rightward displacement of steering column lock actuator 64 past the point where the pawl engages cam surface 68. Therefore, gear 62 is prevented from turning and the ignition key and switch are prevented from moving to the Lock position. Removal of the key from the ignition switch in any position other than Lock is prevented by the internal mechanism of the lock.

Having described a preferred embodiment of my invention, what I claim and desire to secure by U.S. Letters Patent is:

1. A gear shift mechanism for selecting operating ranges of an automatic transmission comprising:
   a shift lever movable among multiple positions corresponding to operating ranges of the transmission, the positions being mutually spaced angularly and axially;
   a selector lever spaced axially from the shift lever;
   means in continual contact with the selector lever and shift lever for transmitting movement of the shift lever to the selector lever;
   a selector position insert located adjacent the selector lever, defining spaced detent surfaces corresponding to positions among which the shift lever moves; and
   spring means for biasing the selector lever toward contact with said detent surfaces.

2. The mechanism of claim 1 wherein the movement transmitting means includes:
   a tube mounted for rotation about its longitudinal axis and fixed against displacement along its longitudinal axis; and
   a plunger located within the tube and supported for rotation about its longitudinal axis and for displacement along its axis;
   the selector lever being supported on the tube at a first pivotable support and extending radially from the first pivotable support into continual contact with the plunger, the shift lever supported on the tube at a second pivotable support and extending radially from the second pivotable support into continual contact with the plunger.

3. The mechanism of claim 1 further comprising:
   a first connection pivotably supporting the selector lever in continual contact with the movement transmitting means; and
   a second connection spaced axially from the first connection, pivotably supporting the shift lever in continual contact with the movement transmitting means.

4. The mechanism of claim 2 wherein:
   the plunger includes a first hole located near a first end of the plunger adjacent the first pivotable support, and a second hole located near a second end spaced axially from the first end adjacent the second pivotable support;

the shift lever includes a first arm extending radially from the first pivotable support into the first hole in the plunger;

the selector lever includes a second arm extending radially from the second pivotable support into the second hole in the plunger;

the tube includes a first pin pivotably supporting the shift lever and directed to produce axial movement of the first arm as the shift lever pivots, and a second pin pivotably supporting the selector lever and directed to produce axial movement of the second arm as the selector lever pivots.

5. The mechanism of claim 4 wherein:

the first arm is formed with a cylindrical surface whose axis is substantially parallel to the first pin;

the second arm is formed with a cylindrical surface whose axis is substantially parallel to the second pin;

the first hole has an axial dimension substantially the same as the diameter of the cylindrical surface of the first arm; and the second hole has an axial dimension substantially the same as the diameter of the cylindrical surface of the second arm.

6. The mechanism of claim 2 wherein:

the selector lever includes a third arm extending radially from the second pivotable support; and the spring means includes a compression spring contacting an end of the plunger, urging the third arm of the selector lever into contact with said detent surfaces.

7. A gear shift mechanism for selecting operating ranges of an automatic transmission for use in a motor vehicle having a steering system, comprising:

a steering column assembly for supporting a steering wheel controlled by the vehicle operator and connected to a steering mechanism;

a shift lever movable among multiple positions corresponding to operating ranges of the transmission, the positions being mutually spaced angularly about the steering column and axially along the steering column;

a selector lever spaced axially along the steering column from the shift lever;

means in continual contact with the selector lever and shift lever for transmitting movement along the steering column from the shift lever to the selector lever;

a selector position insert located adjacent the selector lever, defining spaced detent surfaces corresponding to positions among which the shift lever moves; and spring means for biasing the selector lever toward contact with said detent surfaces.

8. The mechanism of claim 7 wherein the movement transmitting means includes:

a tube mounted on the steering column assembly for rotation about its longitudinal axis and fixed on the steering column assembly against displacement along its longitudinal axis;

a plunger located within the tube and supported for rotation about its longitudinal axis and for displacement along its axis;

the selector lever supported on the tube at a first pivotable support and extending radially from the first pivotable support into continual contact with the plunger, the shift lever supported on the tube at a second pivotable support and extending radially from the second pivotable support into continual contact with the plunger.

9. The mechanism of claim 7 further comprising:

a first connection located near a first end of the steering column assembly, pivotably supporting the selector lever in continual contact with the movement transmitting means; and a second connection spaced axially along the steering column assembly from the first connection, pivotably supporting the shift lever in continual contact with the movement transmitting means.

10. The mechanism of claim 8 wherein:

the plunger includes a first hole located near a first end of the plunger adjacent the first pivotable support, and a second hole located near a second end spaced axially from the first end adjacent the second pivotable support;

the shift lever includes a first arm extending radially from the first pivotable support into the first hole in the plunger;

the selector lever includes a second arm extending radially from the second pivotable support into the second hole in the plunger;

the tube includes a first pin pivotably supporting the shift lever and directed to produce axial movement of the first arm as the shift lever pivots, and a second pin pivotably supporting the selector lever and directed to produce axial movement of the second arm as the selector lever pivots.

11. The mechanism of claim 10 wherein:

the first arm is formed with a cylindrical surface whose axis is substantially parallel to the first pin;

the second arm is formed with a cylindrical surface whose axis is substantially parallel to the second pin;

the first hole has an axial dimension substantially the same as the diameter of the cylindrical surface of the first arm; and the second hole has an axial dimension substantially the same as the diameter of the cylindrical surface of the second arm.

12. The mechanism of claim 8 wherein:

the selector lever includes a third arm extending radially from the second pivotable support; and the spring means includes a compression spring contacting an end of the plunger, urging the third arm of the selector lever into contact with said detent surfaces.

13. A gear shift mechanism for selecting operating ranges of an automatic transmission for use in a motor vehicle having a steering system, comprising:

a steering column assembly for supporting a steering wheel controlled by the vehicle operator and for connection to a steering mechanism;

a shift lever having a free end movable among multiple positions corresponding to operating ranges of the transmission, the positions being mutually spaced angularly about the steering column and axially along the steering column;

a selector lever spaced axially along the steering column from the shift lever;

means in continual contact with the selector lever and shift lever for converting axial movement of the shift lever along the steering column to axial movement of the selector lever and for converting angular movement of the shift lever about the steering column to angular movement of the selector lever;
a selector position insert located adjacent the selector lever, defining spaced detent surfaces corresponding to positions among which the shift lever moves; and
spring means for biasing the selector lever toward contact with said detent surfaces.

* * * * *